United States Patent [19]

Smith et al.

[11] Patent Number: 5,586,744
[45] Date of Patent: Dec. 24, 1996

[54] BOOST DEVICE BYPASS VALVE

[75] Inventors: James C. Smith, Washington, Ill.; Dennis R. Walling, Lafayette, Ind.

[73] Assignee: Caterpillar Inc., Peoria, Ill.

[21] Appl. No.: 439,049

[22] Filed: May 11, 1995

[51] Int. Cl.[6] .................................................. F16K 31/145
[52] U.S. Cl. .......................... 251/61.5; 251/83; 251/285; 137/495
[58] Field of Search .......................... 137/495; 251/61.5, 251/83, 285; 92/13.2, 13.6, 133; 29/890.124, 890.125, 888.4, 888.46; 277/1, 212 FB

[56] References Cited

U.S. PATENT DOCUMENTS

| 2,103,214 | 12/1937 | Coffin | 92/13.6 |
| 3,965,223 | 6/1976 | Benjamin et al. | 92/13.2 |

*Primary Examiner*—Edward K. Look
*Assistant Examiner*—Christopher Verdier
*Attorney, Agent, or Firm*—Dennis C. Skarvan; Joseph W. Keen

[57] ABSTRACT

A wastegate valve for use with turbocharged engines. The wastegate valve vents exhaust gasses upstream of the turbocharger high pressure turbine to reduce turbocharger speed and associated boost pressure. The wastegate valve includes a piston attached to a poppet valve and movable within a housing. The housing receives pressurized intake gasses at a side of the piston to actuate the popper valve between open and closed positions. A diaphragm is sealingly disposed between the piston and housing. The housing includes mechanical stop means to limit the piston travel, thereby reducing flexure of the diaphragm. Additionally, the diaphragm is disposed in the housing in such a way that the diaphragm flexes between reduced peak compressive and tensile stresses.

7 Claims, 6 Drawing Sheets

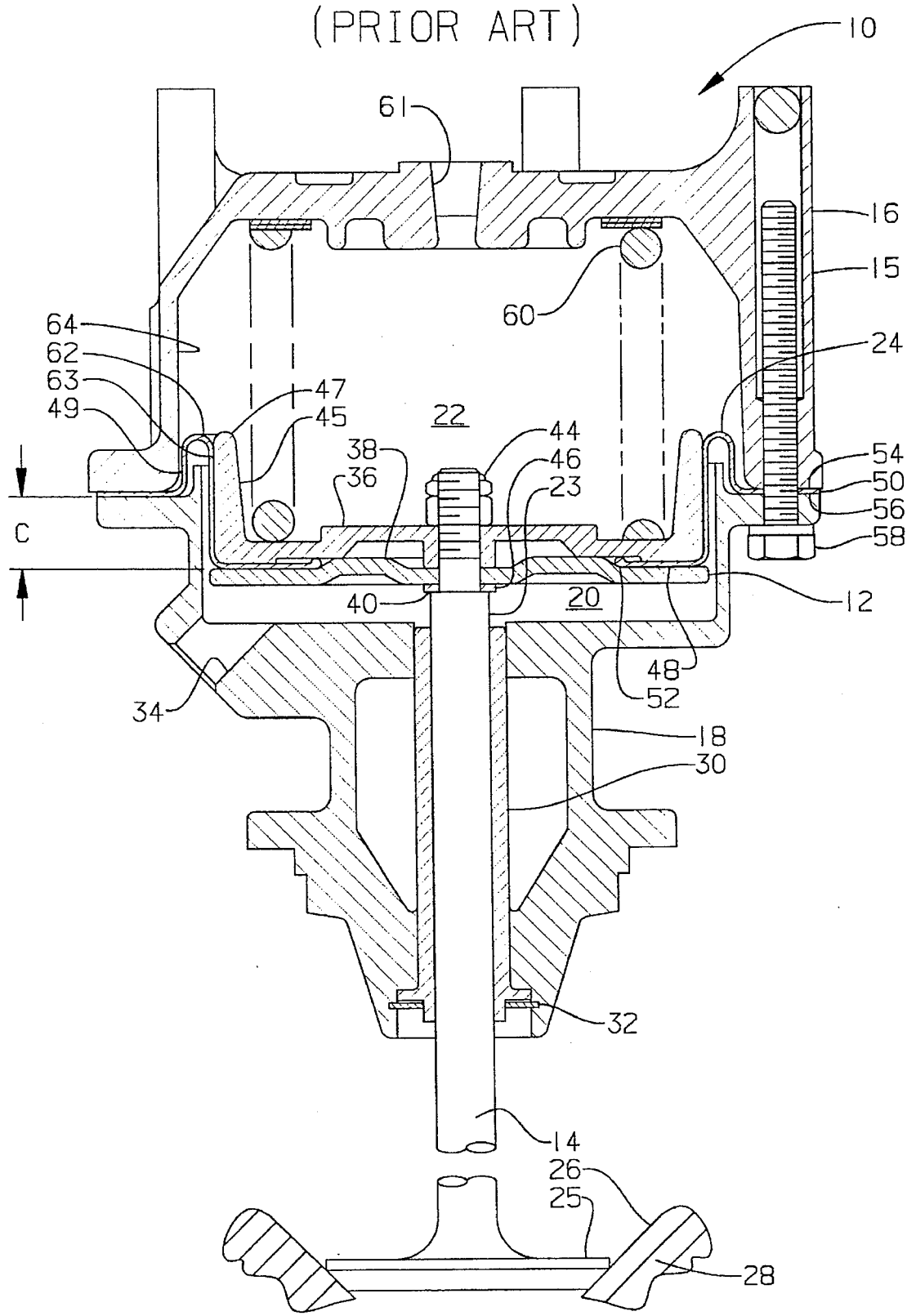
Fig_1a_
(PRIOR ART)

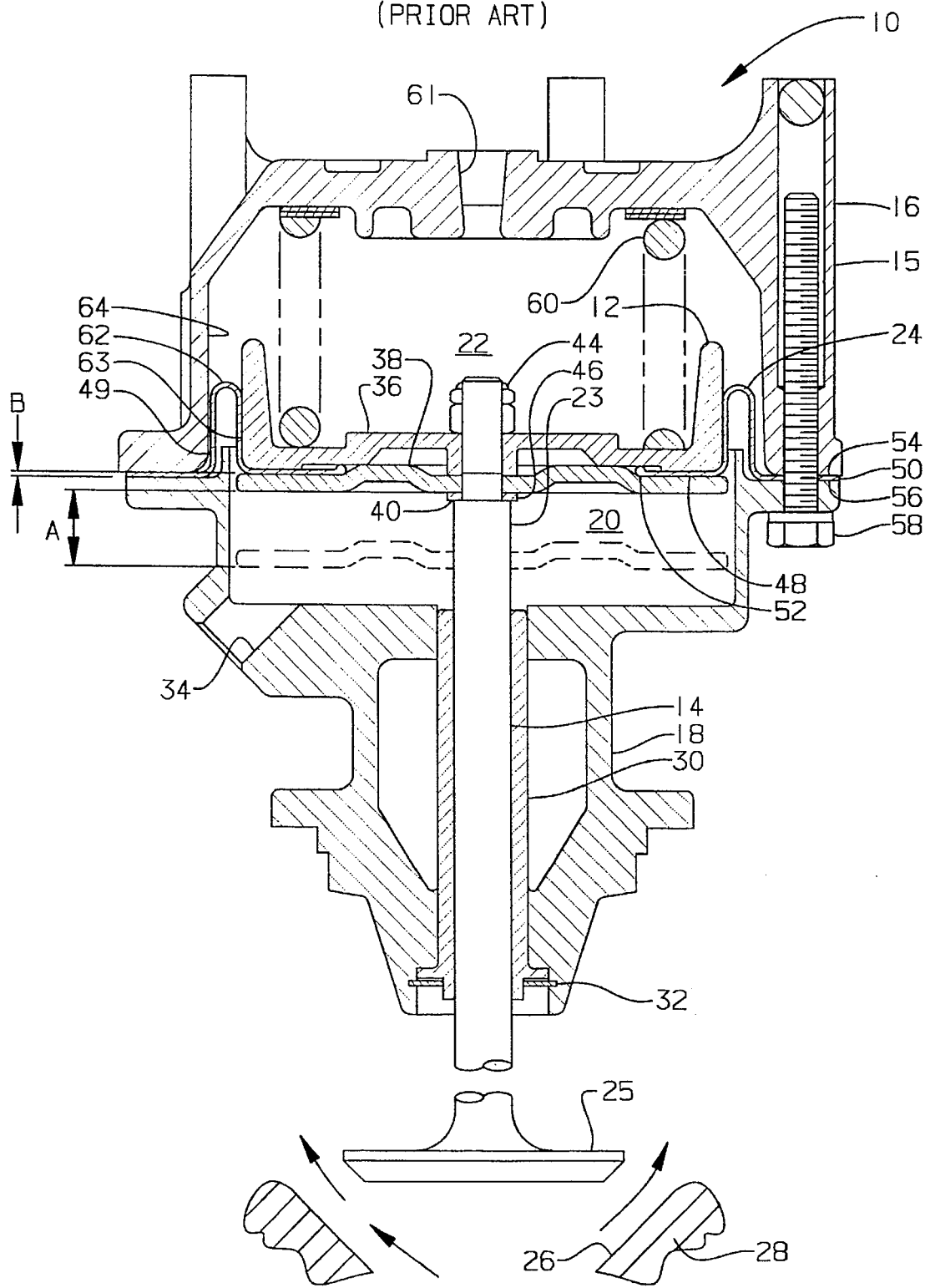
Fig_1b_
(PRIOR ART)

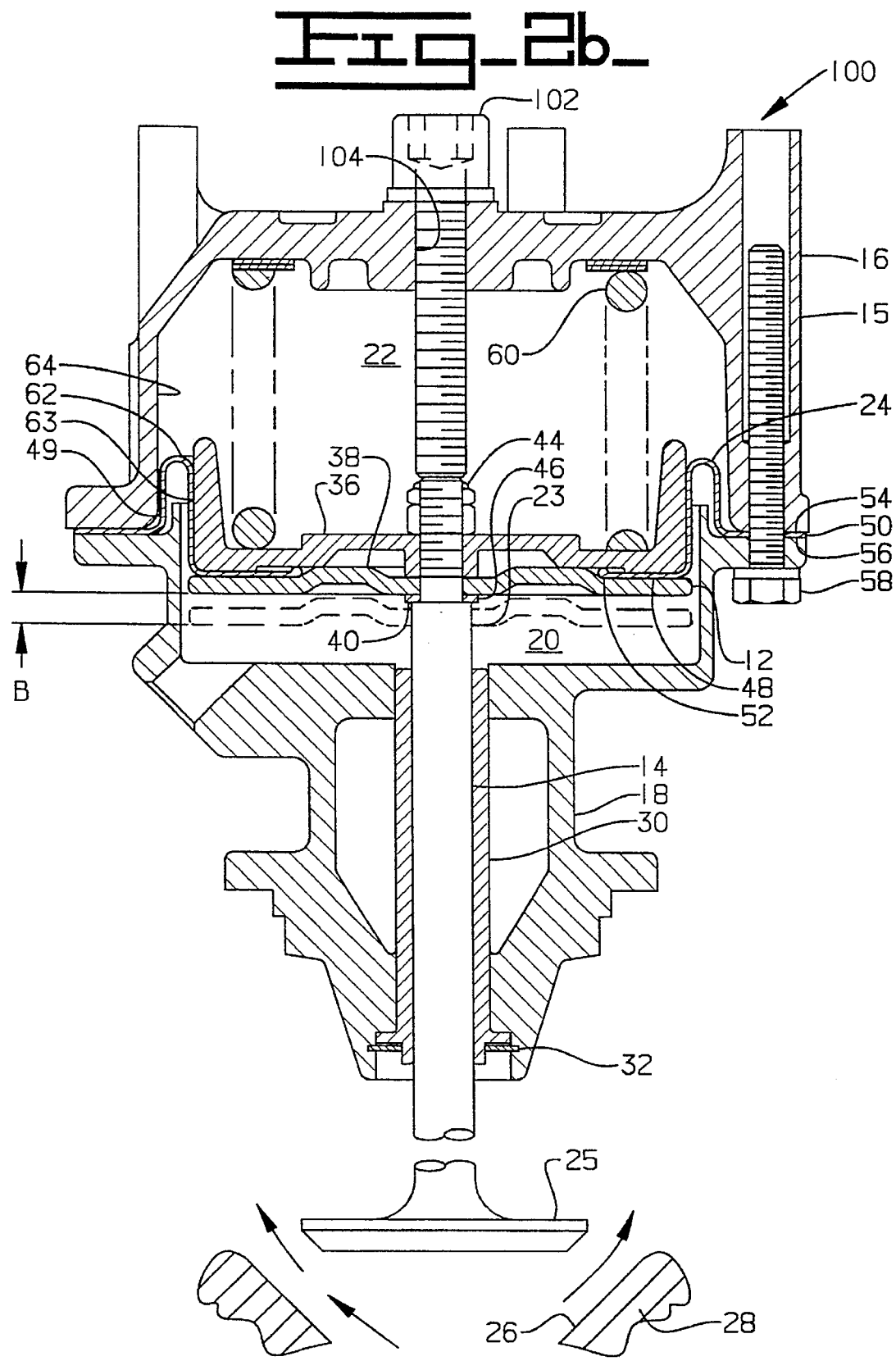

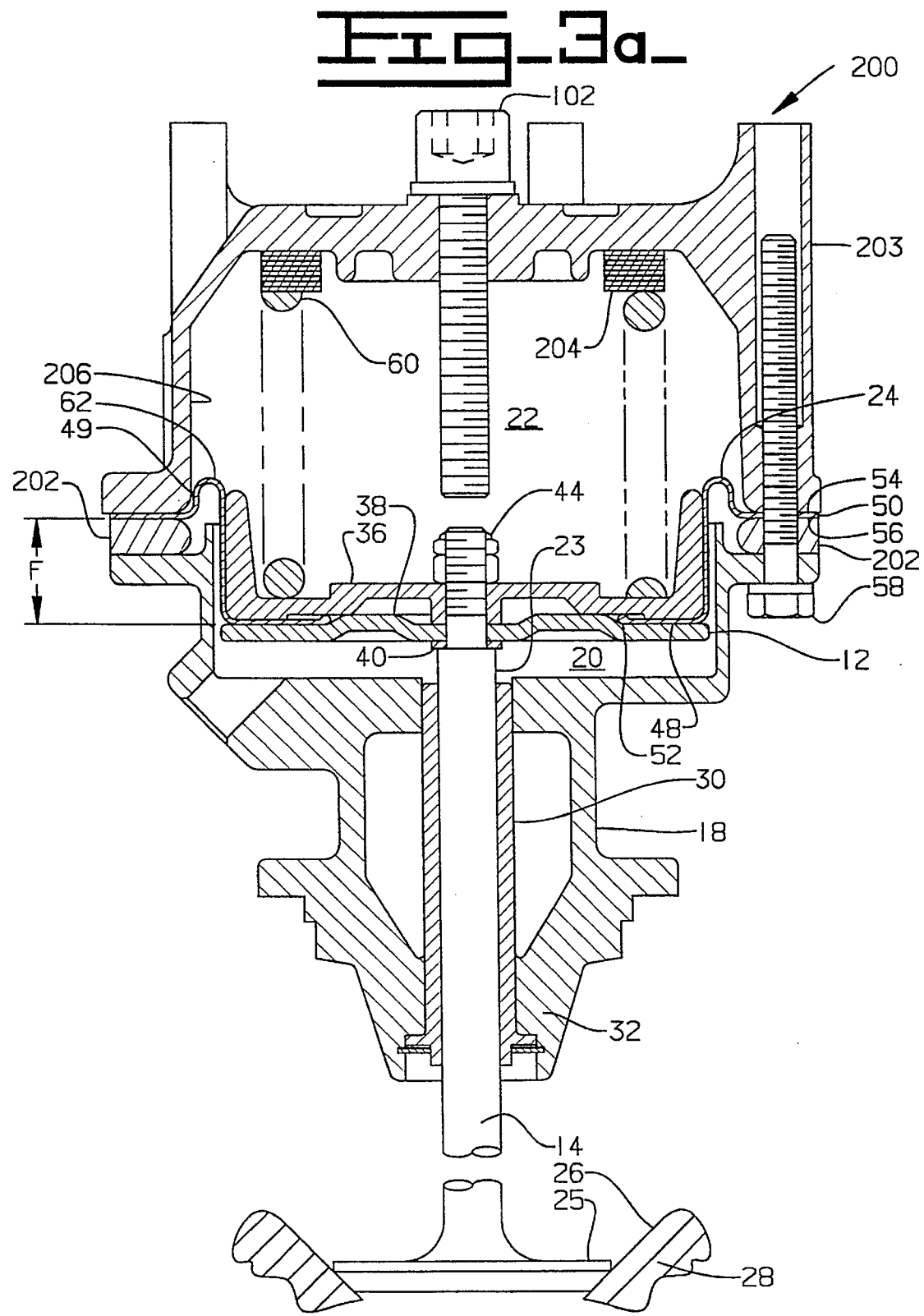
Fig_3a_

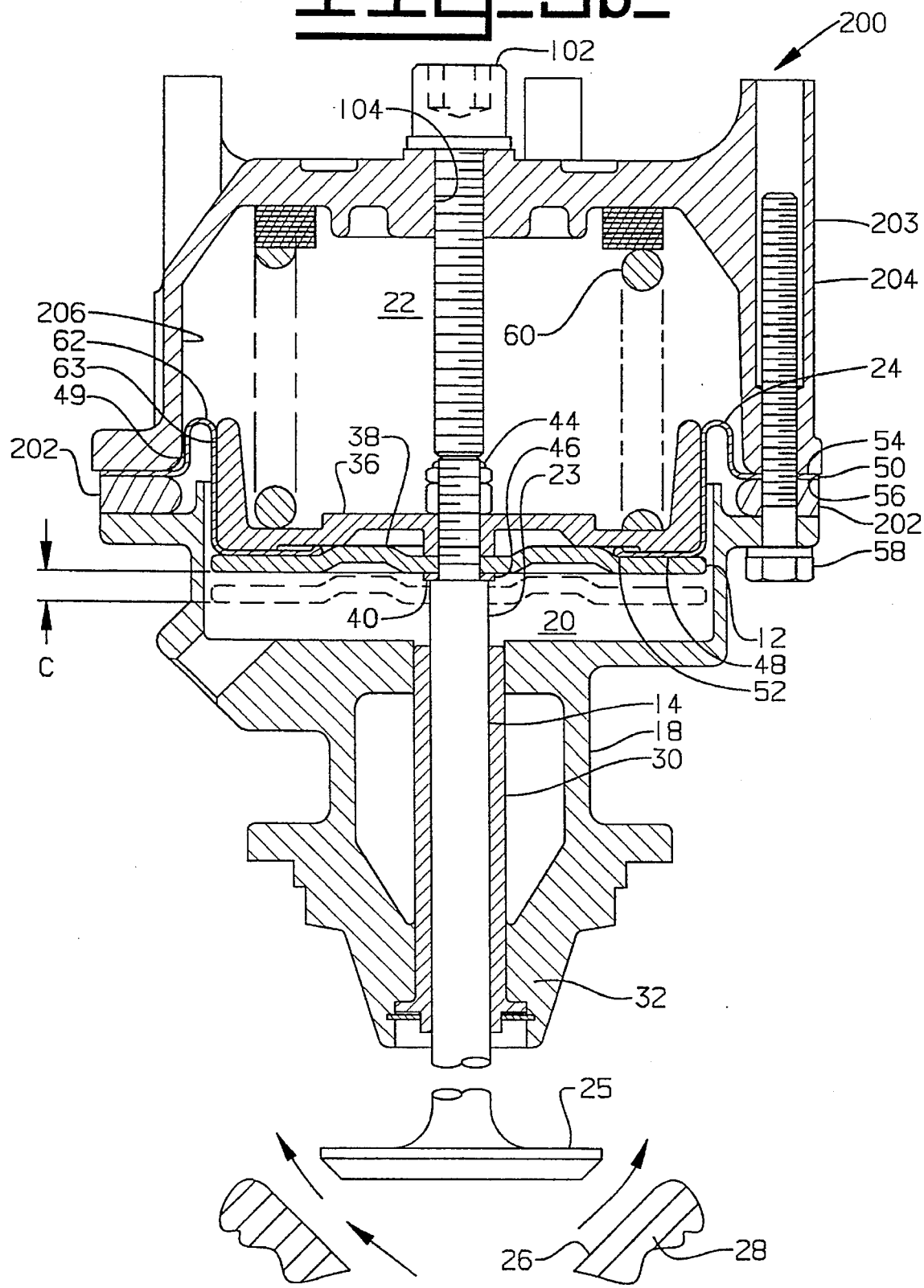

5,586,744

BOOST DEVICE BYPASS VALVE

TECHNICAL FIELD

The present invention relates generally to boost devices for internal combustion engines and, more particularly, to a bypass valve having improved reliability characteristics for use with boost devices.

BACKGROUND ART

Bypass or wastegate valves are provided for use with boosted engines, such as by turbocharging or supercharging, to prevent overboosting the engine. In one configuration, the wastegate valve is designed to release pressurized exhaust gasses from an exhaust manifold upstream of the high pressure turbine of a turbocharger when the exhaust gas pressure exceeds a predetermined pressure. Alternately, the wastegate valve can release pressurized intake air from an intake manifold when the intake air pressure exceeds a predetermined pressure. Regardless of the point of release, the wastegate valve opens to reduce boost pressure below a predetermined pressure, at which point the wastegate valve then closes.

Typically, the wastegate valve includes a piston movable within a housing. Pressurized manifold gasses are communicated to a side of the piston to actuate the piston between first and second positions. A diaphragm is provided between the movable piston and housing to seal across the piston. Because the diaphragm must flex each time the piston moves, the diaphragm must be able to withstand tearing, for example, due to fatigue of the diaphragm material. Should the diaphragm tear, the pressurized manifold gasses will vent to atmosphere and engine performance will be reduced. In addition to withstanding continued cycling, the diaphragm must be able to withstand the high pressure and high temperature environment common to wastegate valves, for example, in an exhaust gas environment.

The present invention is directed to providing an improved bypass or wastegate valve and, in particular, a wastegate valve that reduces loading of the diaphragm during cyclical operation.

DISCLOSURE OF THE INVENTION

According to one embodiment of the present invention, a bypass valve is disclosed comprising a housing, a piston movably disposed in the housing, the piston defining first and second chambers in the housing and being actuable between first and second positions, a first sealing member connected to the piston, the first sealing member being adapted for sealing against a manifold containing pressurized gas, a second sealing member connected between the piston and the housing to seal between the first and second chambers, the second sealing member flexing as the piston is actuated between the first and second positions, and a stop disposed in the housing for limiting travel of the piston and thereby limiting flexure of the second sealing member, the stop defining one of the first and second positions for the piston. In a specific embodiment, the second sealing member is an annular diaphragm connected between the piston and the housing. The annular diaphragm is preformed to define an outer annular portion adapted for connecting to the housing, an inner annular portion adapted for connecting to the piston and a middle portion generally U-shaped in cross-section arranged between the outer annular portion and the inner annular portion. In this specific embodiment, the stop limits flexure of the U-shaped middle portion to reduce stress and increase life.

According to another embodiment of the present invention, a bypass valve is disclosed comprising a housing, a piston movably disposed in the housing, the piston defining first and second chambers in the housing and being actuable between first and second positions, a first sealing member connected to the piston, the first sealing member being adapted for sealing against a manifold containing pressurized gas, a second sealing member connected between the piston and the housing to seal between the first and second chambers, the second sealing member flexing between a first position in which the flexed portion of the second sealing member is in compression and a second position in which the flexed portion of the second sealing member is in tension. In a specific embodiment, the second sealing member is an annular diaphragm connected between the piston and the housing. The annular diaphragm is pre-formed to define an outer annular portion adapted for connecting to the housing, an inner annular portion adapted for connecting to the piston and a middle portion generally U-shaped in cross-section arranged between the outer annular portion and the inner annular portion. In this specific embodiment, the U-shaped middle portion flexes between a first position in which the U-shaped portion is in compression and a second position in which the U-shaped portion is in tension to reduce stress and increase life.

According to another embodiment of the present invention, a method for mounting a diaphragm between a housing and an actuating piston of a bypass valve is disclosed, the diaphragm being pre-formed to define an outer annular portion adapted for connecting to the housing, an inner annular portion adapted for connecting to the piston and a middle portion generally U-shaped in cross-section arranged between the outer annular portion and the inner annular portion, the method comprising the step of connecting the diaphragm between the housing and the actuating piston such that the diaphragm flexes between a first position in which the U-shaped middle portion is in compression and a second position in which the U-shaped middle portion is in tension.

BRIEF DESCRIPTION OF THE DRAWINGS

FIG. 1a is an elevational, cross-sectional view of a conventional bypass valve in a closed position.

FIG. 1b is an elevational, cross-sectional view of the bypass valve of FIG. 1a in its open position.

FIG. 2b is an elevational, cross-sectional view of the bypass valve of FIG. 2a in its open position.

FIG. 3a is an elevational, cross-sectional view of a bypass valve in a closed position according to another embodiment of the present invention.

FIG. 3b is an elevational, cross-sectional view of the bypass valve of FIG. 3a in its open position.

BEST MODE FOR CARRYING OUT THE INVENTION

Figure 2A:
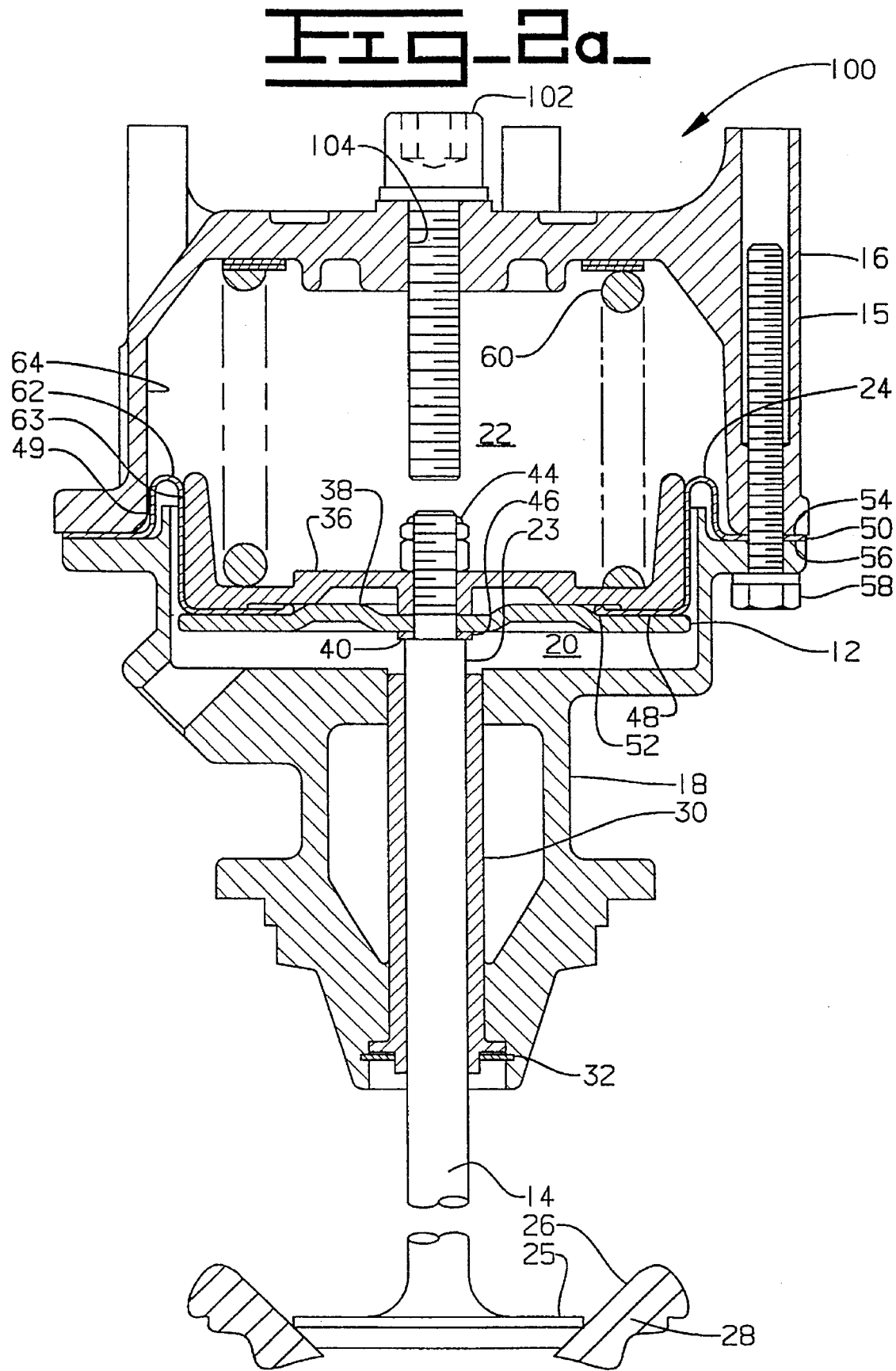
FIG. 2a an elevational, cross-sectional view of a bypass valve in a closed position according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1a, a wastegate or bypass valve 10 is shown in its closed position. Bypass valve 10 is typical of prior art bypass valves in that it includes a piston 12 attached to a valve poppet 14. A housing 15 includes an upper housing portion 16 and a lower housing portion 18. Housing 15 defines a high pressure chamber 20 and a low pressure chamber 22 for actuating piston 12 and popper 14 between open and closed positions. Piston 12 is movable between first and second positions within housing 15 in response to the pressure within high pressure chamber 20 as discussed hereinafter. A diaphragm 24 is provided which extends between the movable piston 12 and the fixed housing 15 to seal between chambers 20 and 22.

Poppet 14 includes a stem 23 connected to piston 12 and a tapered sealing end 25 adapted for sealing against a corresponding tapered sealing surface 26 of a manifold 28. Lower housing portion 18 includes a bearing or guide sleeve 30 for guiding the reciprocating motion of stem 23. Sleeve 30 is retained in housing portion 18 by a retaining ring 32. A high pressure port 34 is disposed in lower housing member 18 and is adapted for communicating high pressure gases from a pressurized intake manifold to chamber 20 via conventional high pressure tubing (not shown).

Piston 12 includes an upper piston member 36 and a lower piston member 38 clamped in place against a shoulder 40 of poppet stem 23. A fastener 44 and bearing washer 46 clamp piston 12 to popper 14.

Diaphragm 24 is a flexible annular membrane constructed of a silicon reinforced nomex material. Diaphragm 24 includes an inner radial sealing end 48, a middle portion 49 and an outer radial sealing end 50. Although flexible, diaphragm is pre-formed or molded having a shape in which middle portion 49 is generally U-shaped in cross-section, and ends 48 and 50 extend flange-like outward from middle portion 49. As such, the diaphragm has a free or zero stress state from which any deviation stresses the diaphragm material.

Diaphragm 24 is sealingly clamped at its inner radial sealing end 48 between upper piston member 36 and lower piston member 38. Diaphragm is further sealingly clamped at its outer radial sealing end 50 between upper housing member 16 and lower housing member 18. Inner radial sealing end 48 includes a lip or raised portion 52 as means for mechanically locking with piston 12. Outer radial sealing end 50 includes bearing surfaces 54 and 56 for mechanically locking between upper housing portion 16 and lower housing portion 18, respectively. Fasteners 58 clamp diaphragm 24 in place between upper housing portion 16 and lower housing portion 18.

Because diaphragm 24 has a pre-formed shape, upper piston member 36 includes an upstanding peripheral portion 45 having an upper end 47. Piston portion 45 supports middle portion 49 to maintain, to the extent possible, the free shape of diaphragm 24 as it flexes to accommodate the movement of piston 12 within housing 15.

Upper housing portion 16 includes biasing means in the form of a spring 60 disposed between piston 12 and upper housing portion 16. Spring 60 exerts a predetermined pressure on piston 12 and poppet 14 to bias poppet 14 toward its closed position. At intake gas pressures below the predetermined pressure set by the spring rate of spring 60, popper 14 remains closed as shown in FIG. 1a. At intake gas pressures above the predetermined pressure set by the spring rate of spring 60, piston 12 and popper 14 are actuated open as shown in FIG. 1b. An orifice 61 vents chamber 22 to atmosphere.

Referring now to FIG. 1b, the total amount of travel of piston 12 and popper 14 during operation is indicated at 'A'. The total travel 'A' is limited only by the spring rate of spring 60; that is, piston 12 travels upward until the pressure of the exhaust gasses in chamber 20 is balanced by the pressure exerted by the compressed spring 60. Diaphragm 24 must flex to accommodate the total travel of piston 12 and poppet valve 14.

In particular, diaphragm 24 flexes a like distance corresponding to the total travel or displacement 'A'. As diaphragm 24 flexes, a portion 62 is guided along outer wall 63 of upper piston member 36. However, due to the amount of travel 'A', diaphragm 24 "over-flexes" in that the inner radial end 48 of diaphragm 24 flexes from a point below outer radial end 50 (FIG. 1a) to a point above outer radial end 50 (FIG. 1b). As diaphragm 24 over-flexes, middle portion 49 deflects such that a portion 62 thereof contacts inner wall 64 of upper housing portion 16. The contact between diaphragm 24 and inner wall 64 creates wear tending to reduce the fatigue life of the diaphragm. Further, the diaphragm over-flexes in that the large amount of travel 'A' results in a corresponding large amount of stretching and associated high tensile stress in diaphragm 24. Continued cycling of diaphragm 24 between its free state and such a high tensile stress reduces the fatigue life of the diaphragm.

Referring now to FIGS. 2a and 2b, a first embodiment of the present invention is shown which limits the overall travel of piston 12 and popper valve 14 and, therefore, the total travel and flexure of diaphragm 24. In FIG. 2a, bypass valve 100 is shown including the same componentry as bypass valve 10. Additionally, bypass valve 100 includes a fastener 102 threaded within a bore 104 of upper housing portion 16. Fastener 102 extends a predetermined length into chamber 22 to provide a mechanical stop for limiting the travel of piston 12 and poppet valve 14. In particular, poppet 14 can travel upward only until stem 23 contacts fastener 102 (FIG. 2b).

As a result, the overall travel 'B' of piston 12 and popper 14 of bypass valve 100 is significantly reduced as compared to the overall travel 'A' of bypass valve 10, and the resulting flexure and stressing of diaphragm 24 is similarly limited. Additionally, the type of flexure is limited. In particular, when popper 14 of bypass valve 100 is in its closed position as indicated in FIG. 2a, diaphragm 24 is in the same flexed position as that of bypass valve 10 (FIG. 1a). However, when poppet 14 is in its open position as shown in FIG. 2b, the flexed position of diaphragm 24 is significantly different from that of bypass valve 10 (FIG. 1b).

Specifically, in bypass valve 100, inner radial portion 48 of diaphragm 24 remains below outer radial portion 50, while in bypass valve 10, inner radial portion is over-flexed to a point above outer radial portion 50. As a result, diaphragm 24 of bypass valve 100 does not come into contact with inner wall 64 and, therefore, wear of the diaphragm is reduced. Further, because the flexure of diaphragm 24 is limited, its corresponding amount of stretching and associated tensile stress is also limited. As a result, continued cycling of diaphragm 24 between its free state and a limited tensile stress gives bypass valve 100 increased fatigue life over that of bypass valve 10.

Referring now to FIGS. 3a and 3b, a second embodiment of the present invention is shown which limits the overall travel of piston 12 and popper valve 14 and further controls the flexure of diaphragm 24. In FIG. 2a, bypass valve 200 is shown including similar componentry as bypass valves 10 and 100. In addition to having mechanical stop means in the form of fastener 102, bypass valve 200 includes a spacer 202 clamped between a modified upper housing portion 203 and lower housing portion 18 and corresponding spacers 204 clamped between spring 60 and modified upper portion 203. As such, the spring rate of spring 60 and the travel of poppet 14 is maintained. In particular, the overall travel 'C' of piston 12 and popper 14 of bypass valve 200 is the same as compared to the overall travel 'B' of bypass valve 100. However, the resulting flexure of diaphragm 24 in bypass valve 200 is significantly altered over that of bypass valves 10 and 100.

In bypass valve 200, the attachment of the diaphragm 24 to the housing is raised over that of bypass valves 10 and 100 such that U-shaped middle portion 49 is compressively stressed as shown in FIG. 3a. In particular, portion 62 of middle portion 49 is "unrolled" such that its pre-formed 'U' shape is flattened or reduced to compressively stress its upper surface. As piston 12 is actuated, the compressive stress of the upper surface of U-shaped middle portion 49 is reduced to zero, corresponding to the free state of diaphragm 24. Further travel of piston 12 increases the tensile stress of the upper surface of U-shaped middle portion 49. In particular, portion 62 of middle portion 49 is "rolled" such that its preformed 'U' shape is heightened or increased to stretch or place in tension its upper surface. As a result, the cyclical stress along the flexed portion of diaphragm 24 is altered from ranging between little or no tensile stress and a maximum tensile stress (as in bypass valve 10) and from between little or no tensile stress and a limited tensile stress (as in bypass valve 100) to ranging between a reduced compressive stress or minus tensile stress and a reduced tensile stress. In particular, bypass valve 200 apportions the operating stress range of bypass valve 100 from a zero-to-maximum tensile stress range to a minus-to-positive tensile stress range to further increase its fatigue life. In the specific preferred embodiment shown, the peak minus and positive operating stresses of bypass valve 200 are each one-half of the maximum operating tensile stress of bypass valve 100.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A bypass valve, comprising:

a housing;

a manifold adapted for containing pressurized gas therein;

a piston movably disposed in said housing, said piston defining first and second chambers in said housing and being actuable between first and second positions;

a first sealing member connected to said piston, said first sealing member being adapted for sealing against an opening of said manifold;

an annular diaphragm connected between said piston and said housing to seal between said first and second chambers, said annular diaphragm flexing as said piston is actuated between said first and second positions;

said annular diaphragm being pre-formed to define an outer annular portion adapted for connecting to said housing, an inner annular portion adapted for connecting to said piston and a middle portion generally U-shaped in cross-section arranged between said outer annular portion and said inner annular portion;

said annular diaphragm flexing uniformly between a first position in which said middle portion is in compression and a second position in which said middle portion is in tension.

2. The bypass valve of claim 1, and further comprising a stop disposed in said housing for limiting travel of said piston and thereby limiting flexure of said diaphragm, said stop defining one of said first and second positions for said piston.

3. The bypass valve of claim 1, wherein:

said housing includes an upper housing portion and a lower housing portion;

said piston includes an upper piston member and a lower piston member; and said outer annular portion of said diaphragm is clamped between said upper housing portion and said lower housing portion and said inner annular portion of said diaphragm is clamped between said upper piston member and said lower piston member.

4. The bypass valve of claim 3, wherein said upper piston member includes an upstanding peripheral portion for supporting said middle portion of said diaphragm, said middle portion flexing entirely out of contact with said housing as said piston is actuated between said first and second positions.

5. The bypass valve of claim 4, wherein said upstanding peripheral portion defines an upper piston surface and said middle portion flexes below said upper piston surface as said piston is actuated between said first and second positions.

6. The bypass valve of claim 5, and further comprising a spacer clamped between said upper housing portion and said lower housing portion and said outer annular portion of said diaphragm is clamped between said upper housing portion and said spacer, said spacer being arranged relative to said annular diaphragm such that said annular diaphragm flexes between said first position in which said middle portion is in compression and said second position in which said middle portion is in tension.

7. The bypass valve of claim 2, wherein said stop comprises a fastener threadably engaged with said housing and being abuttable with said piston.

* * * * *